United States Patent
Kalintsev et al.

(10) Patent No.: US 12,355,613 B1
(45) Date of Patent: Jul. 8, 2025

(54) APPLICATION ASSURANCE

(71) Applicant: Juniper Networks, Inc., Sunnyvale, CA (US)

(72) Inventors: Dmitri Kalintsev, Blackburn South (AU); David Gee, Burton on Trent (GB)

(73) Assignee: Juniper Networks, Inc., Sunnyvale, CA (US)

( * ) Notice: Subject to any disclaimer, the term of this patent is extended or adjusted under 35 U.S.C. 154(b) by 22 days.

(21) Appl. No.: 18/465,780

(22) Filed: Sep. 12, 2023

Related U.S. Application Data

(60) Provisional application No. 63/375,367, filed on Sep. 12, 2022.

(51) Int. Cl.
*H04L 41/0663* (2022.01)
*H04L 41/0659* (2022.01)
*H04L 47/24* (2022.01)

(52) U.S. Cl.
CPC ...... *H04L 41/0663* (2013.01); *H04L 41/0659* (2013.01); *H04L 47/24* (2013.01)

(58) Field of Classification Search
CPC ............ H04L 41/0663; H04L 41/0659; H04L 41/0853; H04L 41/0894; H04L 41/0895; H04L 41/145; H04L 41/5051; H04L 47/24; G06F 11/3684; H04W 12/122
See application file for complete search history.

(56) References Cited

U.S. PATENT DOCUMENTS

| | | |
|---|---|---|
| 2018/0210927 A1 | 7/2018 | Karam et al. |
| 2019/0173736 A1* | 6/2019 | Ponnuswamy ....... H04L 41/145 |
| 2020/0252297 A1* | 8/2020 | Kompella ........... H04L 41/0894 |
| 2021/0176142 A1* | 6/2021 | Clarke ................ H04L 41/5051 |
| 2022/0138081 A1* | 5/2022 | Varma ................. G06F 11/3684 |
| | | 717/124 |
| 2022/0158926 A1* | 5/2022 | Wennerström ...... H04L 41/0853 |
| 2022/0166673 A1* | 5/2022 | Kompella ........... H04L 41/0895 |
| 2022/0330027 A1* | 10/2022 | Djukic ................ H04W 12/122 |

FOREIGN PATENT DOCUMENTS

| | | |
|---|---|---|
| WO | 2023191653 A1 | 10/2023 |
| WO | 2024006980 A1 | 1/2024 |

* cited by examiner

*Primary Examiner* — Le H Luu
(74) *Attorney, Agent, or Firm* — Shumaker & Sieffert, P.A.

(57) ABSTRACT

This disclosure describes techniques for providing application assurance by validating expected packet flows for an application against a model of a network that is to transport the expected packet flows. For example, a method includes obtaining, by an application assurance system, a flow definition that describes a packet flow for an application; determining, by the application assurance system by querying a network model of a network system that transports packet flows for applications, using the flow definition, a set of network nodes and links of the network system that are expected to transport or process the packet flow for the application; obtaining, by the application assurance system, an indication that a network node or link, from the set of network nodes and links, is in an operational state that could affect performance of the application; and in response to obtaining the indication, by the application assurance system, outputting an alert.

20 Claims, 6 Drawing Sheets

APPLICATION ASSURANCE

This application claims the benefit of U.S. Provisional Application No. 63/375,367, filed 12 Sep. 2022, the entire contents of which is incorporated herein by reference.

TECHNICAL FIELD

The disclosure relates to computer networks, and more particularly, to application assurance.

BACKGROUND

A computer network is a collection of interconnected computing devices that can exchange data and share resources. A variety of devices operate to facilitate communication between the computing devices. For example, a computer network may include network infrastructure in the form of routers, switches, gateways, firewalls, and a variety of other devices that are interconnected by network links to provide and facilitate network communication. Such network infrastructure transports application traffic, including application traffic between distributed components of a distributed application as well as application traffic between an application and its users/clients.

IT Operations teams for enterprises and service providers use application performance monitoring (APM) tools to monitor the performance of applications, which includes detecting application failures. If an application fails or otherwise provides unacceptable performance, IT Operations will alert the Network Operations teams (NetOps), which will attempt to identify, localize, and remedy the problem within the network. In general, if a network link or network node fails, NetOps attempts to identify which applications use the failed network component and then modifies the application or the network to route around the failed network component, thereby addressing the failure or performance issue.

SUMMARY

In general, this disclosure describes techniques for providing application assurance by validating expected packet flows for an application against a model of a network that is to transport the expected packet flows. Instead of detecting issues with network elements (e.g., network devices and/or virtualized network services) and then attempting to identify affected applications, the techniques involve using network-related flow definitions for one or more applications as a key to identify a subset of network nodes and links that are expected to transport, forward, or otherwise process (on an active or bypass basis) the corresponding packet flows, and applying both traditional and modern telemetry, flow data, and analytics to each resulting per-application subset. Telemetry and flow data may be used in the analytical phase to enrich detected problems and as supporting evidence.

The techniques may provide one or more technical advantages that realize one or more practical applications. Network performance monitoring solutions collect device telemetry and flow data and may attempt to link any detected anomalies to potentially affected applications. By contrast, the application assurance techniques of this disclosure invert that approach by identifying network infrastructure relevant to an application. The techniques may consequently assist NetOps with assuring current and future performance of critical applications on a proactive basis. That is, the techniques enable correlating network infrastructure issues with not only current impacts to an application, but at least in some cases to potential impacts to applications, such as an outage or degradation of a specific network node or link. The techniques may be used in conjunction with conventional network performance monitoring to provide a more comprehensive application assurance solution.

In an example, a method includes obtaining, by an application assurance system, a flow definition that describes a packet flow for an application; determining, by the application assurance system by querying a network model of a network system that transports packet flows for applications, using the flow definition, a set of network nodes and links of the network system that are expected to transport or process the packet flow for the application; obtaining, by the application assurance system, an indication that a network node or link, from the set of network nodes and links, is in an operational state that could affect performance of the application; and in response to obtaining the indication, by the application assurance system, outputting an alert.

In an example, a computing system comprises processing circuitry coupled to one or more storage devices, the one or more storage devices and processing circuitry configured to: obtain a flow definition that describes a packet flow for an application; determine, by querying a network model of a network system that transports packet flows for applications, using the flow definition, a set of network nodes and links of the network system that are expected to transport or process the packet flow for the application; obtain an indication that a network node or link, from the set of network nodes and links, is in an operational state that could affect performance of the application; and in response to obtaining the indication, output an alert;

In an examples, computer readable storage media is encoded with instructions that, when executed by processing circuitry, cause the processing circuitry to: obtain a flow definition that describes a packet flow for an application; determine, by querying a network model of a network system that transports packet flows for applications, using the flow definition, a set of network nodes and links of the network system that are expected to transport or process the packet flow for the application; obtain an indication that a network node or link, from the set of network nodes and links, is in an operational state that could affect performance of the application; and in response to obtaining the indication, output an alert.

The details of one or more examples are set forth in the accompanying drawings and the description below. Other features, objects, and advantages will be apparent from the description and drawings, and from the claims.

DETAILED DESCRIPTION

Figure 1:
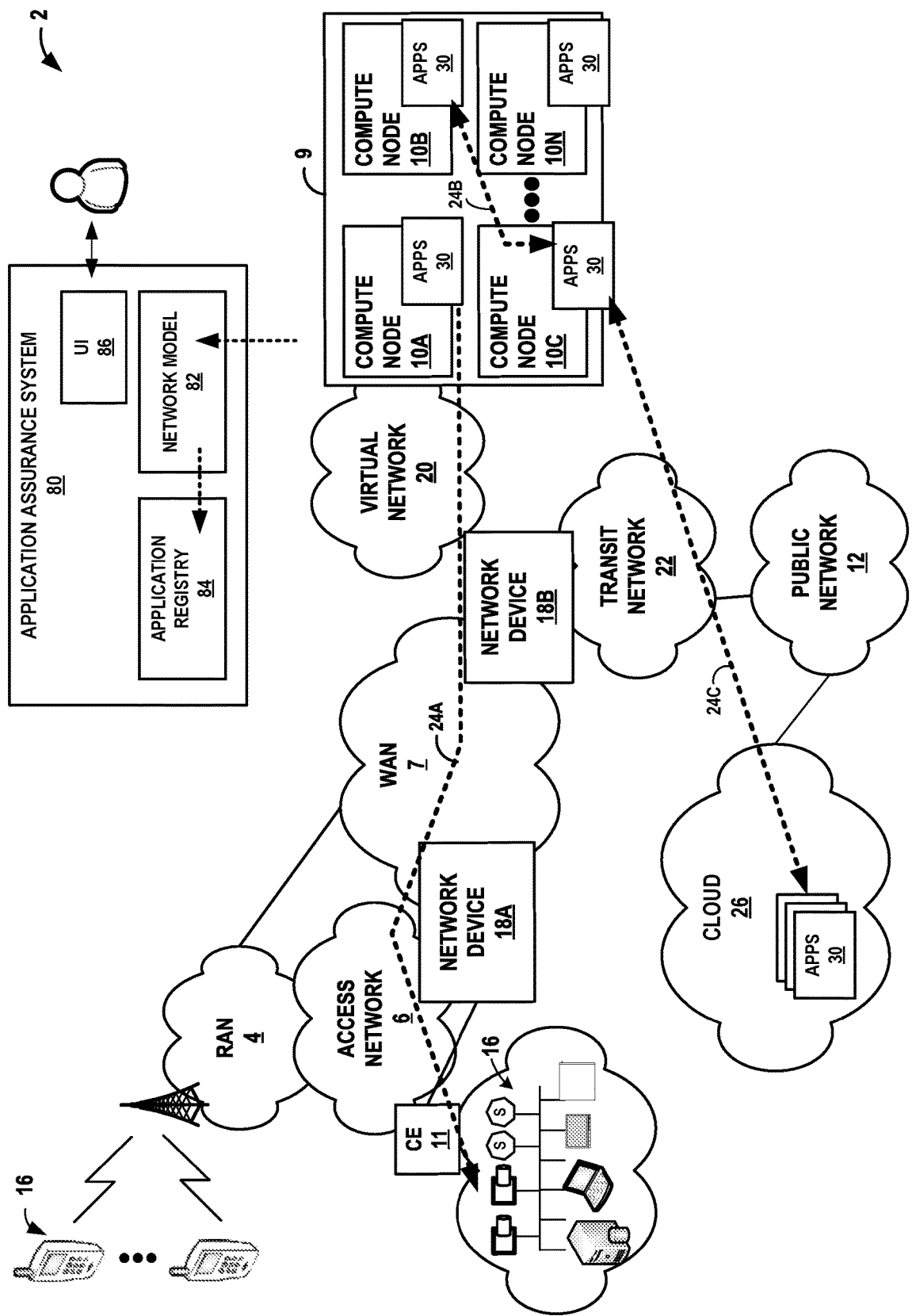
FIG. 1 is a block diagram illustrating an example network system, including an application assurance system for facilitating application assurance for one or more applications that communicate over one or more networks using packet flows, in accordance with one or more aspects of the techniques described in this disclosure.

FIG. 1 is a block diagram illustrating an example network system 2, including an application assurance system for facilitating application assurance for one or more applications 30 that communicate over a network using packet flows, in accordance with one or more aspects of the techniques described in this disclosure. Each of applications 30 may represent a process executed by a real or virtual server. Examples of such servers may be deployed in data center 9 or available via cloud 26, which may represent a public, private, or hybrid cloud. Applications 30 may represent a logically and/or physically distributed application having one or more tiers of components, e.g., implemented as microservices or virtual machines; centralized applications; or that accord with another type of software architecture. To communicate, applications 30 send and receive packets via networks of network system 2.

Applications 30 may be associated with one or more entities, such as enterprises or service providers. Applications 30 may communicate with each other and with client devices 16 via networks of network system 2 to provide services. Applications 30 may implement a database, financial, storage, multimedia, information, data processing, presentation, network services, content access, or other type of application. Although labeled with a common reference number and described herein as applications 30, each instances of applications 30 may represent a different application. For example, applications 30 hosted by cloud 26 may include database application and a data processing application, while applications 30 hosted by compute node 10B may be storage applications, while applications 30 hosted by compute node 10A may be multimedia applications, and so forth. As noted above, various instances of applications 30 may be different components, or different instances of the same component, of an overall distributed application.

In the example of FIG. 1, network system 2 includes access network 6 that provides connectivity to client devices 16 to public network 12 via wide area network 7 (hereinafter, "WAN 7"). WAN 7 and public network 12 may provide packet-based services that are available for request and use by client devices 16. As examples, WAN 7 and/or public network 12 may provide bulk data delivery, voice over Internet protocol (VOIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, client devices 16 connect to network devices 18A-18B (collectively, "network devices 18") via access network 6 to receive connectivity. In this way, client devices 16 may send and receive packets with applications 30. A client may represent, for instance, an enterprise, a residential subscriber, a mobile subscriber, or other user of any of applications 30. Client devices 16 may be, for example, personal computers, laptop computers or other types of computing devices positioned behind customer equipment (CE) 11, which may provide local routing and switching functions. Each of client devices 16 may run a variety of software applications, such as word processing and other office support software, web browsing software, software to support voice calls, video games, video conferencing, and email, among others. For example, client device 16 may be a variety of network-enabled devices, referred generally to as "Internet-of-Things" (IoT) devices, such as cameras, sensors(S), televisions, appliances, etc. In addition, client devices 16 may comprise mobile devices that access the data services of network system 2 via a radio access network (RAN) 4. Example mobile client devices include mobile telephones, laptop or desktop computers having, e.g., a wireless card, wireless-capable netbooks, tablets, video game devices, pagers, smart phones, personal data assistants (PDAs) or the like.

A network service provider operates, or in some cases leases, elements (e.g., network devices) of access network 6 to provide packet transport between client devices 16 and network device 18A. Access network 6 represents a network that aggregates data traffic from one or more of client devices 16 for transport to/from WAN 7 of the service provider. Access network 6 includes network nodes that execute communication protocols to transport control and user data to facilitate communication between client devices 16 and network device 18A. Access network 6 may include a broadband access network, a wireless LAN, a customer premises equipment (CPE) network, or other type of access network, and may include or otherwise provide connectivity for cellular access networks, such as a radio access network (RAN), e.g., RAN 4. Examples of the RAN include networks conforming to a $5^{th}$ Generation (5G) mobile network, $4^{th}$ Generation (4G) mobile network Universal Mobile Telecommunications System (UMTS) architecture, an evolution of UMTS referred to as Long Term Evolution (LTE), 5G including enhanced mobile broadband, mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Network device 18A-18B (collectively, "network devices 18") may each be a customer edge (CE) router, a provider edge (PE) router, SD-WAN edge device, service device, network appliance such as a firewall or gateway, a server executing virtualized network functions, or other computing device that provides connectivity between networks, e.g., access network 6 and public network 12, or between network services. WAN 7 offers packet-based connectivity to client devices 16 attached to access network 6. WAN 7 may represent a public network that is owned and operated by a service provider to interconnect a plurality of networks, which may include access network 6. In some examples, WAN 7 may implement Multi-Protocol Label Switching (MPLS) forwarding and in such instances may be referred to as an MPLS network or MPLS backbone. In some instances, WAN 7 represents a plurality of interconnected autonomous systems, such as the Internet, that offers services from one or more service providers. Public network 12 may represent an edge network coupled to WAN 7 via a transit network 22 and one or more network devices, e.g., a customer edge device such as customer edge switch or router. Public network 12 may include a data center. In the example of FIG. 1, network device 18B may exchange packets with compute nodes 10A-10D (collectively, "compute nodes 10")

via virtual network 20, and network device 18B may forward packets to public network 12 via transit network 22.

In examples of network system 2 that include a wireline/broadband access network, any of network devices 18A-18B may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, any of network devices 18A-18B may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to network device 18B may be implemented in a switch, service card or another network element or component. In some examples, network device 18B may itself be a compute node.

A network service provider that administers at least parts of network system 2 typically offers services to subscribers associated with devices, e.g., client devices 16, that access network system 2. Services offered may include, for example, traditional Internet access, VOIP, video and multimedia services, and security services. As described above with respect to WAN 7, WAN 7 may support multiple types of access network infrastructures that connect to service provider network access gateways to provide access to the offered services, e.g., service provided by compute node 10. In some instances, the network system may include client devices 16 that attach to multiple different access networks 6 having varying architectures.

FIG. 1 illustrates a simplified network system. Each of the various networks, and data center 9 and cloud 26, illustrated and described as part of network system 2 will typically include many hundreds or even thousands of network devices, such as routers, switches, load balancers, gateways, firewalls, etc. (collectively, "network nodes"), connected by network links. The techniques of this disclosure are therefore not limited to any particular network architecture.

Network system 2 in this example also includes a data center 9 having a cluster of compute nodes 10 that provide an execution environment for applications 30. In some examples, each of compute nodes 10 represents a real or virtual server. Data center 9 may include many thousands of compute nodes, interconnected via a network switch fabric comprising one or more tiers of network switches. This network switch fabric of data center 9 is thus another network of network system 2.

In some examples, network system 2 comprises a software defined network (SDN) and network function virtualization (NFV) architecture. In these examples, an SDN controller (not shown) may provide a controller for configuring and managing the routing and switching infrastructure of networks and data centers of network system 2.

In one example, any of compute nodes 10 may run as virtual machines (VMs) or other type of virtual compute instance in a virtual compute environment. Moreover, the compute environment may comprise a scalable cluster of general computing devices, such as x86 processor-based services. As another example, compute nodes 10 may comprise a combination of general-purpose computing devices and special-purpose appliances. Applications 30 executed by compute nodes 10 can scale through the allocation of virtualized memory, processor utilization, storage and network policies, as well as horizontally by adding additional load balanced VMs.

Client devices 16 may be configured to communicate with one or more of applications 30 hosted on servers that are part of data center 9 or cloud 26. In some aspects, cloud 26 may represent one or more data centers, similar to data center 9. As noted above, each instance of application 30 may represent a logically centralized application or may represent a component of a distributed application, for example. A client device 16 can use the services of an application 30 by communicating with the application using packet flows transported by networks of network system 2.

Typically, packet flows between any two devices, such as between network devices, pairs of compute nodes 10, any of compute nodes 10 and any of client devices 16, for example, can traverse the physical network using many different paths. Here, "the physical network" refers to any combination of the underlying physical networks of network system 2, including access network 6, RAN 4, WAN 7, transit network 22, public network 12, and networks of data center 9, or cloud 26, for instance.

A "flow" can be defined by one or more values used in a header of a packet, the "n-tuple": drawn from the protocol, Source IP address, Destination IP address, Source port, and Destination port that are used to route packets through the physical network. The 5-tuple, for instance, includes the five fields mentioned previously. The protocol field of the packet header specifies the communications protocol, such as TCP or UDP, and Source port and Destination port refer to source and destination ports (e.g., TCP/UDP ports) for the flow. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by an agent, firewall or SD-WAN system, network performance monitoring system, or other system that identifies, e.g., using a port and protocol list or deep packet inspection (DPI), a type of service or application associated with the flow in that the flow transports application data for the type of service or application identified using the AppID.

In general, this disclosure uses the term "flow description" of "flow definition" to refer to data that describes a packet flow of one or more packets exchanged between an instance of application 30 and another instance of application 30 or a client device 16. The flow description may include the 5-tuple or other n-tuple, for instance, and is described in further detail with respect to FIG. 2.

FIG. 1 illustrates example packet flows 24A-24C (collectively, "packet flows 24"). Application 30 executing on compute node 10A sends packets of packet flow 24A to one of client devices 16 via multiple networks of network system 2. Application 30 executing on compute node 10B exchanges packets of packet flow 24B with application 30 executing on compute node 10C. Application 30 executing on compute node 10C exchanges packets of packet flow 24C with application 30 hosted by and executing on cloud 26. Some of packet flows 24 are illustrated as unidirectional but will typically be associated with a reverse packet flow for communications in the other direction. In some cases, pairs of applications 30 and client devices 16 may communicate using multiple packet flows. Each of packet flows 24 has characteristics that may be represented using a flow description. In some cases, multiple instances of a certain type of application 30 will communicate with another application using multiple packet flows, and these multiple packet flows may be grouped under a common flow description. For example, respective packet flows for two instances of an application 30 executing on different compute nodes and having different IP addresses may be identified in a single flow description using a prefix that encompasses both IP addresses.

Networks of network system 2 transport packets of a packet flow along a path that is determined by states and configurations of the networks. The path for a given packet flow is dependent on such characteristics of each network (and the overall network system 2) as network topology, routing policies, interface configurations, reservations, firewall configurations, operator intents configured in a network, available transport protocols, encapsulation/tunnelling methods (such as GRE, IPSec, EVPN VXLAN, IP-MPLS, VPLS), bypass routes (e.g., LSP bypass routes) configured for active routes, other traffic/load within the network, and so forth, all of which affect the individual routing and processing decisions made by the various network devices that make up networks of network system 2. There may be several different paths of equal cost between two network devices. In some cases, packets belonging to a packet flow from a source device to a destination device may be distributed among the various possible paths using a routing strategy called multi-path routing at some network devices.

In accordance with techniques of this disclosure, application assurance system 80 provides application assurance by validating expected packet flows for an application 30 against a model of network system 2 that is to transport the expected packet flows. In an example, application assurance system 30 obtains flow definitions that describe expected flows for an application 30. The flow definitions may be obtained from existing tools, such as an application or network performance monitoring system, from existing flow records gathered from the network during prior operation of the application, or manually entered, for example. Application registry 84 of application assurance system 80 may store one or more flow definitions for each of one or more applications 30 operating over network system 2. Because networks of network system 2 may transport and process traffic for many thousands of different applications, flow definitions stored by application registry 84 may be used especially for performing assurance for critical applications for an enterprise whose performance is particularly important to the enterprise, such as significant revenue-generating applications or applications that support critical infrastructure. User interface (UI) 86 enables a user to enter or modify flow definitions, select certain applications from a list of known applications 30 operating over network system 2, or otherwise interact with application assurance system 80 to determine the flow definitions for application registry 84.

Application assurance system 80 computes a network model 82 from the configuration and runtime state of networks of network system 2. Network model 82 represents, in effect, a digital twin of the real network(s). Network model 82 may incorporate a network topology of the network nodes and links, resource availabilities, bypass routes configured for active routes, reservations, interface configurations, and/or other data descriptive of network system 2 in order to accurately represent the networks. Network model 82 may be developed in part using network device telemetry obtained from the network nodes of network system 2, network topology information obtained using routing protocols or topology configuration data, or other data descriptive of network system 2. Network model 82 can be queried using flow definition data (e.g., a n-tuple) to return a list of network nodes and links of network system 2 that would transport, forward, or otherwise process the corresponding packet flow. Network model 82 is illustrated as integrated with and managed by application assurance system 80, but network model 82 may be generated by a separate system that exposes network model 82 for querying by application assurance system 80.

Network model 82 may be limited to only some networks of network system 2. For example, certain networks may not expose their underlying topology, configuration, or other information needed for building an effective network model 82. Network model 82 may incorporate any such network as a node.

Application assurance system 80 may query network model 82 using the flow definitions in application registry 84 for an application to identify, for each flow definition, the set of network nodes and links that forward, transport, or otherwise process a corresponding packet flow for the flow definition. This identified set of network nodes and links is referred to as the active set. To process a flow definition as part of a query, network model 82 may effectively simulate the operation of network nodes and links of network system 2 to determine the set of network nodes and links forwarding, transporting, or otherwise processing a packet of a packet flow corresponding to the flow definition, tracing the route of the packet from source application to destination application. In some cases, the query of network model 82 may indicate the packet flow is unable to reach the destination.

In some examples, application assurance system 80 may use the identified, active set of network nodes and links to query network model 82 for any bypass nodes and links that the corresponding packet flow would traverse in case of a failure of one of the active set of network nodes or links—the result of this query is the bypass set of network nodes and links. The superset of the active sets identified for the respective flow definitions for the application is the active set for the application and represents those network nodes and links of network system 2 that packet flows sourced by or destined to the application are expected to traverse. The superset of the bypass sets identified for the respective flow definitions for the application is the bypass set for the application and represents those network nodes and links of the real network that packet flows sourced by or destined to the application may be expected to traverse in case of failure of a network node or link of the active set for the application.

The active and bypass sets of network nodes and links may be labeled with an application label of labels 234 for the application. This label may be later used as a "scope" for traditional network assurance monitoring, such as node health, bandwidth utilization, predictive trend analytics, etc. As a result, a conventional monitoring tool tasked with monitoring the health of the application may avoid collecting network data—from at least some network devices—that will not be relevant to the application's performance, for the network nodes are not in or connected to links in the active or bypass sets for the application. The monitoring tool may be integrated within the application assurance system or separate from the application assurance system. An example monitoring system is described in U.S. Provisional Patent Application Ser. No. 63/367,452, filed Jun. 30, 2022 and entitled "APPLICATION-AWARE ACTIVE MEASUREMENT SYSTEM FOR MONITORING NETWORK HEALTH," and in U.S. Provisional Patent Application Ser. No. 63/367,457, filed Jun. 30, 2022 and entitled "FRAMEWORK FOR AUTOMATED APPLICATION-TO-NETWORK ROOT CAUSE ANALYSIS," the entire contents of each being hereby incorporated by reference herein. Additional details of a graph model for a network system and for device configuration are described in PCT application PCT/RU2022/000100, filed 31 Mar. 2022 and entitled "NETWORK GRAPH MODEL AND ROOT CAUSE ANALYSIS FOR A NETWORK MANAGEMENT SYSTEM," and in U.S. Publication No. 20189/0210927, published 26 Jul. 2018 and entitled "CONFIGURATION, TELEMETRY, AND ANALYTICS OF A COMPUTER INFRASTRUCTURE USING A GRAPH MODEL," the entire contents of each being hereby incorporated by reference herein.

Subsequently, when application assurance system 80 receives an indication that a network node or link is in an operational state that could affect performance of an application, the application assurance system can correlate that affected network component to the application by using the application label. Application assurance system 80 may then output an alert, which may include one or more of the following: the specific application that is affected by the affected network node or link, the type of impact (e.g., currently affected because the affected network node or link is in the active set for the application, or at risk from loss or degradation because the affected network component is in the bypass set for the application), an indication of the affected component. Whether a network node or link is in an operational state that could affect performance of an application may be determined using service level indicators that define performance criteria for the application.

The techniques may provide one or more technical improvements that realize at least one practical application. For example, application assurance system 80 can assist NetOps-who may communicate with application assurance system 80 using user interface (UI) 86—with determining whether a network issue is affecting one or more of critical applications, which may affect prioritization and the immediate remediation activities accordingly. As another example, application assurance system 80 can assist NetOps with detecting issues that put one or more of critical applications at risk, which can inform and incite planning for a longer-term appropriate action. As another example, application assurance system 80 can provide confidence/assurance that application flows for a given application are not at risk because the telemetry from the active set for the application is not indicating any network issues, which is possible to determine in part because of the limited scope of network analysis that is the active set for the application previously identified by the application assurance system. As a result, application assurance system 80 can help to sustain the user experience through lower mean time to application recovery (MTTR) and mean time between failure (MTBF) from correlating potential impact from affected bypass network components to the application, reduce attack surface through continuous validation of zero-trust network policy controls (assure network security posture), and provide multi-vendor, cross-domain App network experience assurance for IT Ops' & NetOps' peace of mind while delivering applications, including business-critical applications. In some cases, because network flows may cross administrative or network boundaries, active assurance system 80 is nevertheless able to provide proactive end to end application assurance by leveraging a network model 82 that incorporates network information from the multiple administrative domains/networks, and at least in some cases without the need to generate probes to traverse the path for a packet flow.

Figure 2:
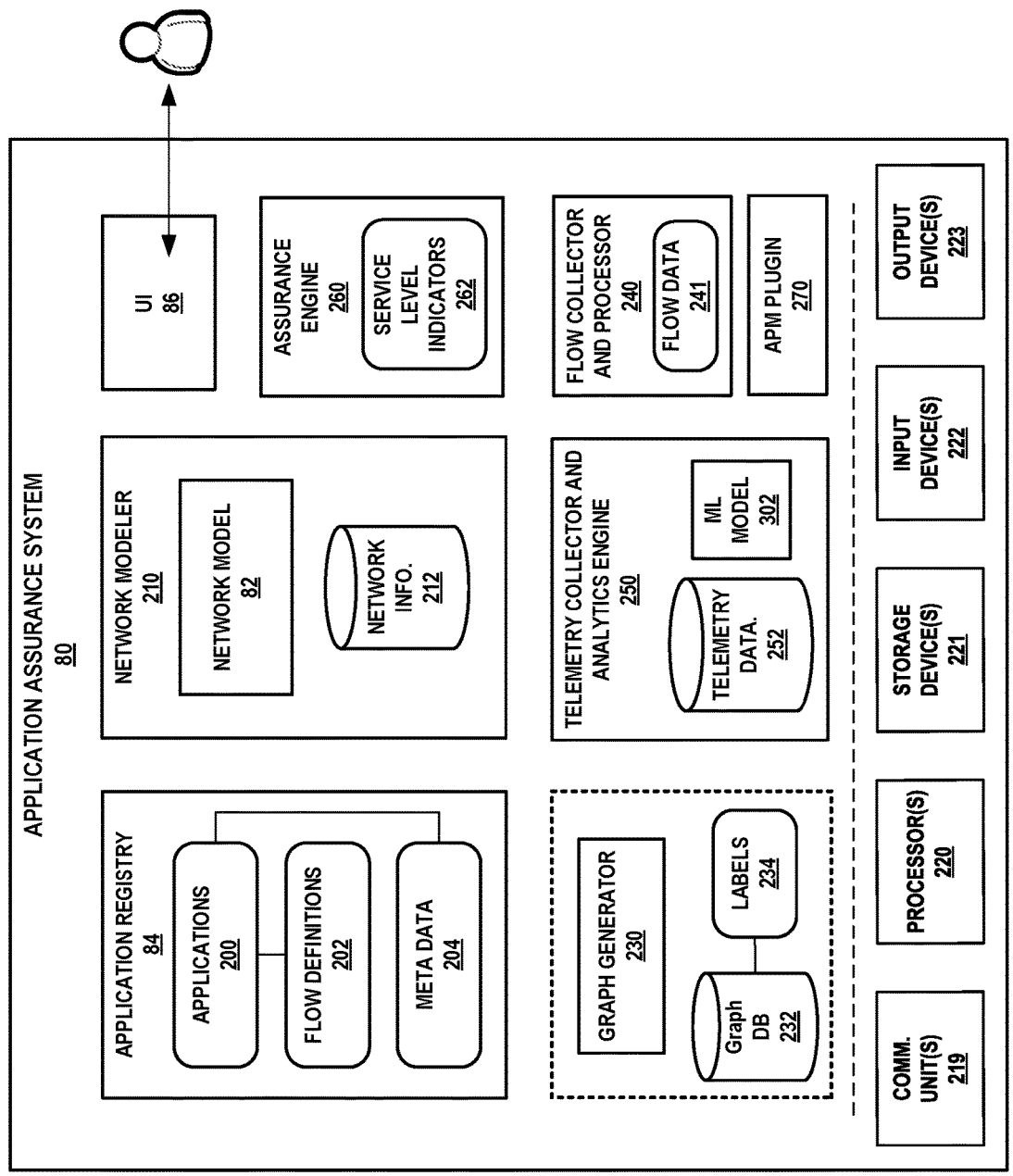
FIG. 2 is a diagram illustrating an example application assurance system in detail, in accordance with techniques of this disclosure.

FIG. 2 is a diagram illustrating an application assurance system 80, in accordance with techniques of this disclosure. In this example of FIG. 2, application assurance system 80 includes a computing system having one or more processors 220, one or more input devices 222, one or more output devices 223, one or more communication units 219, and one or more storage devices 221. In some examples, application assurance system 80 is implemented by a computing system that is a cloud computing system, server farm, and/or server cluster (or portion thereof) that provides services to client devices and other devices or systems. In other examples, application assurance system 80 may be implemented through one or more virtualized compute instances (e.g., virtual machines, containers) of a data center, cloud computing system, server farm, and/or server cluster.

One or more of the devices, modules, storage areas, or other components of application assurance system 80 may be interconnected to enable inter-component communications (physically, communicatively, and/or operatively). In some examples, such connectivity may be provided by communication channels, a system bus, a network connection, an inter-process communication data structure, or any other method for communicating data.

One or more processors 220 of application assurance system 80 may implement functionality and/or execute instructions associated with application assurance system 80 or associated with one or more modules illustrated herein and/or described below, including application registry 84, graph generator 230, graph database 232, telemetry collector and analytics engine 250, flow collector and processor 240, user interface 86, and assurance engine 260. One or more processors 220 may be, may be part of, and/or may include processing circuitry that performs operations in accordance with one or more aspects of the present disclosure. Examples of processors 220 include microprocessors, application processors, display controllers, auxiliary processors, one or more sensor hubs, and any other hardware configured to function as a processor, a processing unit, or a processing device. Application assurance system 80 may use one or more processors 220 to perform operations in accordance with one or more aspects of the present disclosure using software, hardware, firmware, or a mixture of hardware, software, and firmware residing in and/or executing at application assurance system 80. Any one or more of application registry 84, graph generator 230, graph database 232, telemetry collector and analytics engine 250, flow collector and processor 240, user interface 86, and assurance engine 260 may be hosted by a cloud provider or other third-party.

One or more communication units 219 of application assurance system 80 may communicate with devices external to application assurance system 80 by transmitting and/or receiving data, and may operate, in some respects, as both an input device and an output device. In some examples, communication units 219 may communicate with other devices over a network. In other examples, communication units 219 may send and/or receive radio signals on a radio network such as a cellular radio network. In other examples, communication units 219 of application assurance system 80 may transmit and/or receive satellite signals on a satellite network such as a Global Positioning System (GPS) network. Examples of communication units 219 include a network interface card (e.g., an Ethernet card), an optical transceiver, a radio frequency transceiver, a GPS receiver, or any other type of device that can send and/or receive information. Other examples of communication units 219 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 222 may represent any input devices of application assurance system 80 not otherwise separately described herein. One or more input devices 222 may generate, receive, and/or process input from any type of device capable of detecting input from a human or machine. For example, one or more input devices 222 may generate, receive, and/or process input in the form of electrical, physical, audio, image, and/or visual input (e.g., peripheral device, keyboard, microphone, camera).

One or more output devices 223 may represent any output devices of application assurance system 80 not otherwise separately described herein. One or more output devices 223 may generate, receive, and/or process input from any type of device capable of detecting input from a human or machine. For example, one or more output devices 223 may generate, receive, and/or process output in the form of electrical and/or physical output (e.g., peripheral device, actuator).

One or more storage devices 221 within application assurance system 80 may store information for processing during operation of application assurance system 80. Storage devices 221 may store program instructions and/or data associated with one or more of the modules described in accordance with one or more aspects of this disclosure. One or more processors 220 and one or more storage devices 221 may provide an operating environment or platform for such modules, which may be implemented as software, but may in some examples include any combination of hardware, firmware, and software. One or more processors 220 may execute instructions and one or more storage devices 221 may store instructions and/or data of one or more modules. The combination of processors 220 and storage devices 221 may retrieve, store, and/or execute the instructions and/or data of one or more applications, modules, or software. Processors 220 and/or storage devices 221 may also be operably coupled to one or more other software and/or hardware components, including, but not limited to, one or more of the components of application assurance system 80 and/or one or more devices or systems illustrated as being connected to application assurance system 80.

In some examples, one or more storage devices 221 are temporary memories, meaning that a primary purpose of the one or more storage devices is not long-term storage. Storage devices 221 of application assurance system 80 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage devices 221, in some examples, also include one or more computer-readable storage media. Storage devices 221 may be configured to store larger amounts of information than volatile memory. Storage devices 221 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Application assurance system 80 may provide network connectivity and isolation assurance for the specific applications 200, each expressed using a set of network flow definitions 202. Applications 200 may be particular applications of interest to a user/operator of application assurance system 80, such as critical applications. "Critical applications" may be those that are business significant or business critical to an enterprise or service provider, where downtime for the application leads to significant revenue loss, cost, or significantly degraded user experience (UX).

A user may select, register, or otherwise cause application assurance system 80 to register an application in application registry 84 as one of applications 200. Applications 200 may be a data structure that stores, for one or more registered application, an identifier for the application. Application registry 84 is thus a registry of those of the applications that are to be assured by application assurance system 80, which will continuously validate the state of the network nodes and links that carry or would carry the flows of interest (as defined application registry 84) against a set of criteria defined in Service Level Indicators (SLIs) 262, described below. Application assurance system 80 may report, via UI 86, details of any identified issues to the network operator. In this way, application assurance system 80 can provide application assurances to an operator with regard to network connectivity and isolation beyond what an Application Performance Monitoring (APM) system can provide.

Each application of applications 200 is defined in part by one or more flow definitions 202 for flows of the application. Applications 200 use network connectivity and communications to operate. There are generally two types of network communications of interest: (1) Users accessing an application, and (2) intra-application component communications, e.g., a business logic component communicating with a backend DB for a distributed application. Such network communications for an application occur within packet flows, which may be represented and described in flow definitions 202 for the application as n-tuples, e.g., the 5-tuple), as described above. In some examples of flow definitions 202, at least the source or destination endpoint is a fully unique combination of IP address, IP protocol, and Port number. The Port is the transport-layer port. The opposite source or destination endpoint in most cases will be a combination of range of IP addresses, e.g., a subnet larger than/32, and Port numbers, e.g., the ephemeral port range. This can allow a user of application assurance system 80 to define the 'user' side of the application flows, where the 'user' may be located, e.g., on a known subnet or on a public Internet (any network address). Optional user-configurable meta data 204 may be application-specific or system-wide to provide further enrichment. IP addresses may be physical, virtual, or a combination of physical and virtual.

Application assurance system 80 may obtain flow definitions in a variety of ways. In some examples, a customer's (or other user's) application performance monitoring (APM) system contains an up-to-date information for each of applications 200. Specifically, the APM system includes an IP address of each application component, protocol/port pairs of all of the application's endpoints, and any server/client relationships between these components. Thus, network-related information above can be retrieved by application assurance system 80 from the APM via its application programming interface (API) and stored as flow definitions 202. In some examples, flow collector and processor 240 collects flow record information from network devices using, e.g., sFlow or other similar mechanisms. During operations, flow collector and processor 240 may identify flows to/from an application's endpoints that do not match the existing flow definitions 202 for the application in application registry 84. These flows will be incorporated automatically or first presented to the operator for review and potential incorporation into application registry 84 as a flow definition for the application. In some examples, some of the packet flows will represent users accessing an application, such as an enterprise's employees or enterprise customers communication with an application "frontend". The APM may not contain information about the IP addresses of these users. Application assurance system 80 may indicate such missing information and prompt, via UI 86, the operator to obtain it from other sources, e.g., manual records or IP Address Management (IPAM), and enter it to complete the flow definitions 202 for the application. In some examples, flow definitions 202 may be entered manually via UI 84, learned via pattern matching, learned using machine learning, or may be obtained in some other manner.

Optional APM plugin 270 may represent an integrated interface to assist application assurance system 80 with communicating to an APM system for the customer. For example APM plugin 270 may be used to check for changes in flow definitions 202 or to provide information to an IT Operations team via the APM system. Such information can include an indication of alerts (described elsewhere herein), indications of particular affected network components or affected applications, indications of affected users, and so on. In this way, application assurance system 80 can provide actionable insights to the IT Operations team. Various components of application assurance system 80 illustrated and described in FIG. 2 may be external systems, e.g., network model 82, flow collectors (e.g., part of flow collector and processor 240), and telemetry collectors (e.g., part of telemetry collector and analytics engine 250).

Application assurance system 80 identifies a specific set of network devices and links of a network system (e.g., network system 2 of FIG. 1) that carry or are expected to carry packet flows for applications 200. This set can include the backup set as well as the active set. Application assurance system 80 then reviews/checks the set for signs of common problems known to affect application connectivity. Example checks performed by application assurance engine 80 may be broadly categorized into four groups: Flow Path Availability, Flow Path Resilience, Flow Path Performance, and Flow-related Network Access Security, which are described below in further detail.

Identification of those the network devices and links that are relevant to a set of specific applications 200, in that packet flows for applications 200 are expected to traverse such network components, is enabled by a mathematical model of the network covering locations where the packets flows of applications 200 may flow to facilitate network communications and, in some cases, network isolation. Network modeler 210 is configured to receive a query that includes a flow definition of flow definitions 202 as an input and, after processing the flow definition using network model 82, return a set of network nodes and links that the corresponding flow would follow through the network (the "primary flow path"), including equal cost multipath (ECMP) hops, and in this way are expected to transport or otherwise process the packet flow. With additional queries, network modeler 210 may also identify whether a bypass node and/or link exists for each node/link on the "primary" flow path. Network model 82 may cover common networking technologies, including major encapsulation/tunnelling methods, such as GRE, IPSec, EVPN VXLAN, IP-MPLS, VPLS, other VPNs, etc. Network model 82 may incorporate all network nodes and links under the administrative control of the organization for which the application assurance system 80 provides end-to-end application network communications assurance, in some cases across multiple domains and irrespective of whether such network components are in, e.g., one or more data centers, data center interconnects, campus, WAN/SD-WAN, access networks, or public/private/hybrid clouds. However, as noted earlier, there may be gaps in coverage where a packet flow traverses a network not under administrative control (or where the administrator otherwise lacks visibility in the network). Network modeler 210 obtains network information from one or more networks and stores the network information to network information database 212. For examples, network modeler 210 may obtain network information in the form of configuration and operating state data from customer-controlled or otherwise accessible network devices that transport or otherwise process packet flows. Network modeler 210 processes the network information to generate network model 82. Network modeler 210 should support a wide variety of network device vendors, models, and networking technologies to facilitate comprehensive modeling of the real network. Because networks are dynamic in nature, network modeler 210 may obtain network information indicative of dynamic changes to the network, with which to update network model 82 and provide correct information to the application assurance system 80. In some examples, network modeler 210 may update network model 82 periodically, e.g., once per hour. Network modeler 210 may be integrated in application assurance system 80 or be provided by a third-party, for example, that makes network model 82 available for querying by application assurance system 80.

As described above, graph generator 230 of application assurance system 80 may query network model 82 using flow definitions 202 for an application of applications 200 to identify, for each flow definition, the set of network nodes and links that the corresponding packet flow would traverse in network system 2, or which function as bypass network components for such active network components. Once graph generator 230 receives the set of network nodes and links that are expected to transport (on an active or bypass basis) the corresponding flows for an application of applications 200, graph generator 230 may consolidate and deduplicate the results, apply respective application labels 234, and store the final set of network nodes and links to graph database (DB) 232. Because multiple applications are likely to traverse common network nodes and links, deduplication of repeated appearances of such common network nodes and links provides the distinct network nodes and links expected to traverse, forward, or otherwise process the packet flows for the application(s), as defined in application registry 84. Each of the network nodes and links in graph database 232 may be labeled with application identifiers (AppIDs) corresponding to those applications that will be affected by the network node or link. For example, graph generator 230 may determine that a network node is expected to forward a packet flow for Application A1 on an active basis. Graph generator 230 may label the network node in graph DB 232 with AppID "A1" and an indication that the network node will be "active" for AppID "A1". As another example, graph generator 230 may determine that the network node is expected to forward a packet flow for Application A2 on a bypass basis. (For instance, the network node is on a backup path for the packet flow for Application A2. Graph generator 230 may label the network node in graph DB 232 with AppID "A2" and an indication that the network node will be "bypass" for AppID "A2". Such labels are illustrated separately from graph DB 232 as labels 234. Graph database 232 and labels 234 may be implemented using one or more of a graph, table, list, database, or other combination of data structures.

The final set of network nodes and links may be consolidated and stored (again, in graph database 232) on a per-application of applications 200 basis, or it may represent the full set of network nodes and links that are expected to transport, forward, or otherwise process packet flows for any of one or more applications 200. Labels 234 may be applied to each network component (network node or link) and are application labels that identify, for the network component, those applications 200 having packet flows that are expected to traverse the network component. Using graph database 232 may allow application assurance system 80 to preserve relationships between the network nodes and links, and to query them when implementing telemetry and analytics checks.

Telemetry collection and analytics engine 250 may connect to the network nodes, as identified as relevant and instructed by assurance engine 260, to gather telemetry information needed to perform the Flow Path Checks described below in this document. Telemetry collection and analytics engine 250 may interoperate with a variety of vendors and network equipment types, e.g., load balancers and firewalls in addition to routers and switches, may enable rapid addition of new vendors/types. Telemetry collection and analytics engine 250 may include a flexible pipeline of telemetry sources and processors to implement Flow Path Checks and to enable rapid addition of new types of checks.

Some Flow Path Checks may require information obtained from the network flow data, such as may be gather using sFlow. Flow collector and processor 240 may configure the network nodes so that they export the flow data from the interfaces carrying the applications 200 packet flows or providing backup paths to applications 200 packet flows. Flow collector and processor 240 collects the exported flows while filtering and tagging them based on matches to flow definitions 202 and responds to the queries from telemetry collection and analytics engine 250 using stored flow data stored to telemetry data 252, e.g., as flow records.

Conventional approaches to infrastructure monitoring, where a monitoring system collects device telemetry and network flow data, focus on the "network" as the unit of assurance. The monitoring system attempts to link any detected anomalies back to the potentially affected applications. This conventional approach has shortcomings addressed by application assurance system 80. Specifically, in the conventional approach, it is often hard or impossible to reliably identify which application(s) have been affected by an outage or degradation of a specific network node or link. This capability is important to NetOps teams looking to reduce the Mean Time to Recover (MTTR) for Critical Apps, because it helps them prioritize remedial work. Also in the conventional approach, it is not possible to correlate a network infrastructure issue with a *potential* impact on applications. For instance, it is not possible to correlate an outage or degradation of a network node that provides backup path to a specific application. Such capability, however, is needed to detect "at risk" situations that could cause an outage, thus reducing Mean Time Between Failures (MTBF) of critical applications due to network infrastructure problems.

To address the above shortcomings of conventional approaches, assurance engine 260 performs checks on network devices and links of network paths expected to transport and otherwise process packet flows corresponding to flow definitions 202. In this way, assurance engine 260 may provide assurance to a user/operator regarding applications 200. Assurance engine 260 may provide network connectivity and/or isolation verification checks that may each be of two general types: reactive and proactive. Reactive checks detect network conditions that have present, measurable impact on applications. Proactive checks detect network conditions that may or will lead to such impact in the future.

Reactive and proactive checks may be further divided into two types: health and health risk. Health checks are designed to detect conditions in the network that have present measurable impact on packet flows for applications 200, e.g., outright disruption in connectivity, delay in transmission, or packet loss. Health risk checks are designed to look for conditions that are likely to lead to health impacts, e.g., over time or due to a fault. Examples of such conditions are a trend of link bandwidth usage leading to exhaustion over time, a degrading component such as an optical transceiver, absence of a redundant network path, or presence of unwanted network connectivity from untrusted segments. The rationale behind the "Health Risk" checks is the sometimes-critical nature of applications 200 under assurance. Preventing a potential unanticipated problem is better than emergency remediation once a failure occurs. Some of the check definitions below provide guideline values, such as target drops, utilization, or time periods. These values are provided as a guide, subject to change, and may be user-configurable via UI 86 to match individual customers' circumstances. The various checks are defined, at least in part, using service level indicators 262 that among other things, may provide threshold values for the various checks described below, specify which checks are to applied to certain applications 200, and so forth. Checks may be applied to each packet flow, using flow definitions 202, for an application to provide assurances for that application.

Assurance engine 260 applies Active Flow Path Availability checks to ensure active packet flows can be transported now and in the future on an expected flow path determined by querying network model 82 based on operational states of network nodes and links along an expected flow path. Operational state of a network node can include configuration state for interfaces, tunneling, forwarding, network services, etc. Active Flow Path Availability checks may include, but are not limited to:

Path Existence-Identify network device configuration and/or realized state conditions that prevent successful network connectivity needed by application 200 (i.e., check health). Assurance engine 260 confirms, by querying network model 82, if a path for a specified flow definition is possible, including forwarding and firewall/load balancing services.

Degrading Optic Modules-Identify optical modules that are projected to reach the performance degradation threshold of >0.5% errors on a packet flow path within one month (i.e., check risk). Assurance engine 260 may direct telemetry collector and analytics engine 250 to query network devices along the would-be active path for optical module degradation.

Bad Cables-Identify bad cables (e.g., generating >0.1% frame check sequence (FCS) errors) on the expected packet flow path (i.e., check health). Assurance engine 260 may direct telemetry collector and analytics engine 250 to query network devices along the would-be active path for bad cables.

Known-bad Network Operating System (NOS) Versions—Identify network devices with NOS that has known high-risk (Common Vulnerability Scoring System (CVVS) Score >=7) security issues on the packet flow path (i.e., check risk). Assurance engine 260 may direct telemetry collector and analytics engine 250 to query network devices along the would-be active path for devices with a NOS with Common Vulnerabilities and Exposures (CVEs).

Assurance engine 260 applies Flow Path Resilience (Detour/Bypass Availability) checks to determine/ensure resilience for packet flows based on operational states of network nodes and links along an expected flow path. Flow Path Resilience checks may include, but are not limited to:

Detour/Bypass Existence-Find node/link single points of failure on the packet flow's active path (check risk). Assurance engine 260 may query network model 82 to check whether a network node/link bypass exists for each would-be active network node/link on the active path.

Detour/Bypass Spare Capacity-Identify links on the packet flow's backup path that don't have enough capacity (e.g., would reach utilization >90% 5-minute average sustained over >=3 consecutive sampling periods) to take over if the active path fails (i.e., check risk). Assurance engine 260 may query network model 82 and telemetry collector and analytics engine 250 to check whether, based on interface utilization data, the bypass links have sufficient capacity to take over should the primary links fails.

Detour/Bypass Degrading Optic Modules-Find backup interfaces that have optics that trend toward the degradation threshold of, for instance, >0.5% errors within 1 month (i.e., check risk). Assurance engine 260 may query telemetry collector and analytics engine 250 to perform hardware checks on the node/link bypasses to identify optic module degradation.

Detour/Bypass Bad Cables—Find backup links that have bad cables (e.g., generating >0.1% FCS errors) (i.e., check risk). Assurance engine 260 may query network model 82 and telemetry collector and analytics engine 250 to perform hardware checks on the node/link bypasses to identify any bad cables.

Detour/Bypass Known—bad NOS Versions-Find node bypass devices with NOS with CVEs with CVSS Score >=7 (i.e., check risk). Assurance engine 260 may query network model 82 and telemetry collector and analytics engine 250 to perform hardware checks along the node/link bypasses to identify nodes with a NOS with CVEs.

Assurance engine 260 applies Flow Path Performance checks to determine/ensure performance for packet flows based on operational states of network nodes and links along an expected flow path. Flow Path Performance checks may include, but are not limited to:

Interface Congestion—Detect interfaces in the Flow Path that may be causing delays (e.g., >10× baseline delay) or drops (e.g., >0.5%) to the packet flows (i.e., check health). Assurance engine 260 may query network model 82 and telemetry collector and analytics engine 250 for drop rates and (Virtual Output) queue lengths along the Flow Path.

Headroom Exhaustion—Detect interfaces in the Flow Path that are likely to reach congested state (e.g., utilization >90% 5-minute average sustained over >=3 consecutive sampling periods) in the next 1 month (i.e., check risk). Assurance engine 260 may feed per-hop link utilization data time series into ML model 302 that can extrapolate into future and predict the point in time when an unacceptable utilization level will be reached.

Assurance engine 260 applies Flow-related Network Access Security checks to determine/ensure security and isolation assurance for packet flows based on operational states of network nodes and links along an expected flow path. Flow-related Network Access Security checks may include, but are not limited to, Network Isolation Checks and Abnormal App Flow Behavior/Composition.

Network Isolation Checks (L3/L4)—Check if the network is configured to only allow traffic explicitly covered by an application's registered flow definitions 202 to reach application IPs, by e.g., either not routing or dropping traffic that does not match. Assurance engine 260 may query network model 82 to check if the network configuration and state would permit traffic that does not match flow definitions 202 for the application.

Abnormal App Flow Behavior/Composition—Identify flows that match flow definitions 202 that fall outside of a "baseline behavior," e.g., unusual/unexpected user IPs, data access/transmission patterns such as volume or time of day. Such flows may point to security issues that deserve investigation. Assurance engine 260 may feed sFlow records for the monitored applications 200 into an unsupervised machine learning model 302 to form a baseline. After the initial training period, assurance engine 260 may start using ML model 302 to identify outliers in the flow records newly collected by flow collector and processor 240.

A machine learning system separate from application assurance system 80 may be used to train ML model 302, or training may be integrated within application assurance system 80 to continually/periodically update ML model 302 using newly-obtained telemetry and SLE data. Training may be executed by a computing system having hardware components similar to those described with respect to application assurance system 80. ML model 302 may include one or more neural networks, such as one or more of a Deep Neural Network (DNN) model, Recurrent Neural Network (RNN) model, and/or a Long Short-Term Memory (LSTM) model. In general, DNNs and RNNs learn from data available as feature vectors, and LSTMs learn from sequential data.

Other types of machine learning may be applied to train ML model 500. For example, one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms may be used to train ML model 302.

ML model 302 processes training data for training ML model 302, data for prediction, or other data. Training data may include any one or more of telemetry data 252, flow data 241, flow definitions 202, network information 212, event data, or calendar data. ML model 302 may in this way be trained to recognize anomalous traffic patterns that are unacceptable deviations from a network performance baseline, versus those deviations from the baseline that are expected given normal fluctuations in the network caused by calendar events, known periodicity, and so forth. For example, ML model 302 may be trained to recognize that traffic will be light on a Monday that is a holiday compared to a Monday that is not a holiday.

The above-described checks performed by assurance engine 260 may provide an indication that a network node or link is in an operational state that could affect performance of an application of applications 200. As a result, assurance engine 260 may use network-related definitions of the application 200, in the form of flow definitions 202, as a key to identify a subset of network nodes and links that carry or would carry the corresponding packet flows, and apply both traditional and modern telemetry, flow data, and analytics to each resulting per-application subset or to the set for the collection of applications for a customer. Telemetry and flow data may be used in the analytical phase to enrich detected problems and also to provide supporting evidence of problems.

Assurance engine 260 can correlate that affected network component to affected applications using application labels 234. Assurance engine 260 may then output an alert via UI 86, which may include one or more of the following: the specific application that is affected by the affected network component, the type of impact (e.g., currently affected because the affected network component is in the active set for the application, or at risk from loss or degradation because the affected network component is in the bypass set for the application), and/or an indication of the affected component including a location thereof (for remedial action). As already noted, whether a network node or link is in an operational state that could affect performance of an application may be determined using service level indicators 262 that define performance criteria for the application or system-wide.

User interface module (UI) 86 can generate data indicative of various user interface screens that graphically depict the results of application assurance. UI module 84 can output, e.g., for display by a separate display device, the data indicative of the various user interface screens. UI module 84 can also output, for display, data indicative of graphical user interface elements that solicit input. Input may be, for example, application and flow definitions for application registry 84, queries, or other input.

Another perspective for reactive and proactive checks is provided below, with additional details.

Operational integrity checks may include checks of device operational state for:
  Hardware faults and degradation over time, e.g., Optical power, potentially faulty cables, PSU, fans.
  Hardware resource exhaustion trends, e.g., CPU/RAM on routing engines
  Critical NOS Software defects, e.g., CVE
  End of support NOS versions and Hardware (boxes/modules).
  Governance controls config checks, e.g., SSH vs. Telnet, TLS versions, routing protocol auth, etc.

Operational Impairment checks may include the following process, for a particular packet flow:
  Compute all links/interfaces the flow would go through based on the Realized State.
  Query the identified links/interfaces' health-load, TX/RX errors, queue lengths and drops.
  For any link/interface above with the "impaired" health gather the diagnostic data, e.g., top talkers, drop causes, etc., in as few steps as possible.

NetOps may address any issues identified by application assurance system 80 by reconfiguring, modifying, or replacing network devices, modifying applications to route around the problem, or otherwise modifying the network or applications. Application assurance system 80 may output indications of such issues optionally in conjunction with outputting an alert, e.g., via UI 86. Modifying an application may involve reconfiguring communication settings to select a different service (endpoint) or gateway or other intermediate network device; communicate using a different communication channel; or otherwise cause an application to send packet flows on a different network path and/or generate the packet flows receive a different quality of service. To assure the applications on the modified systems, application assurance system 80 may repeat using the above-described processes. In some cases, in response to an alert from application assurance system, a SDN controller, orchestrator, or other application or network controller may automatically modify the network or applications.

Figure 3A:
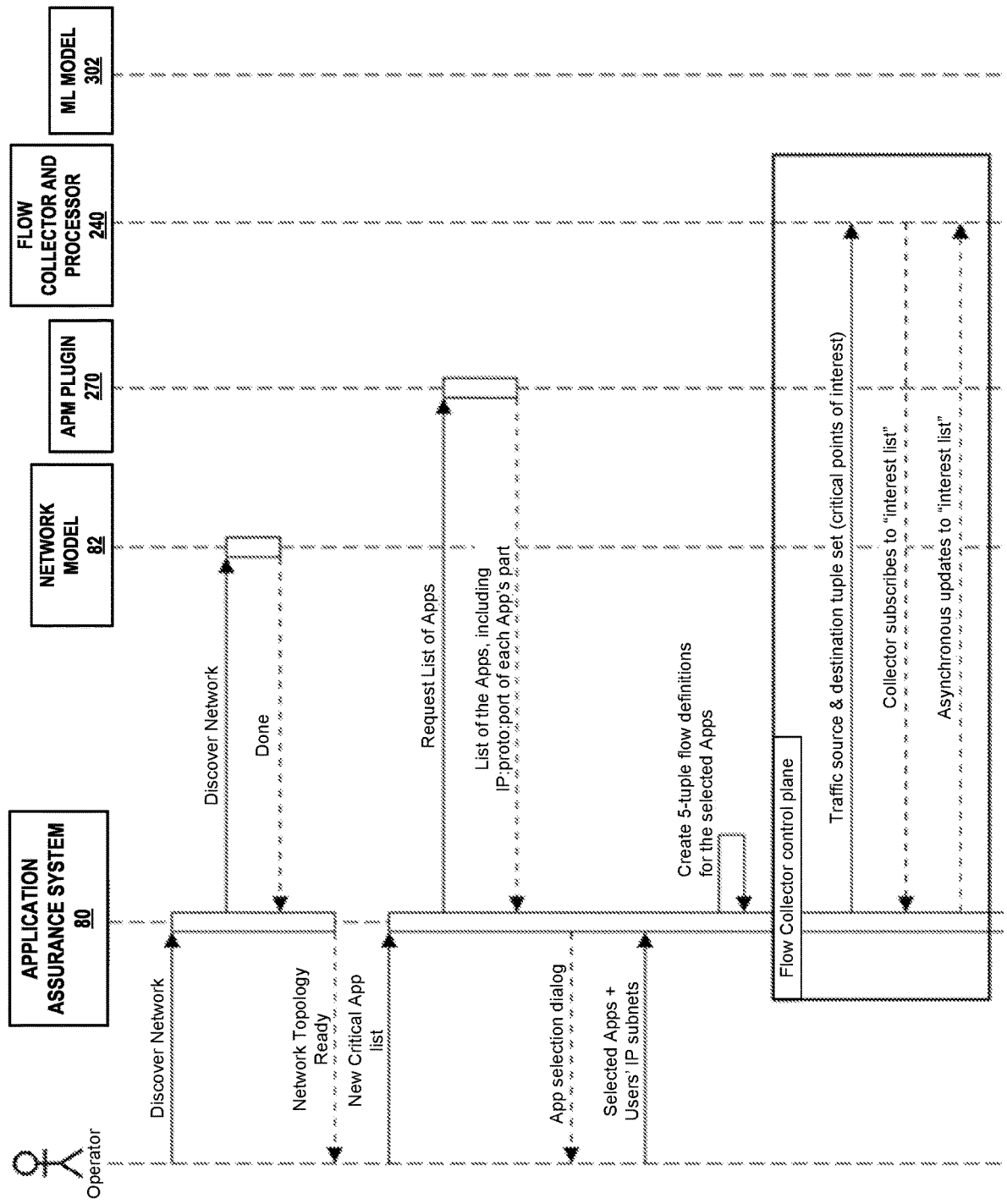
FIGS. 3A-3C depict a conceptual diagram for an example process to provide application assurance, in accordance with techniques of this disclosure.
Figure 3B:
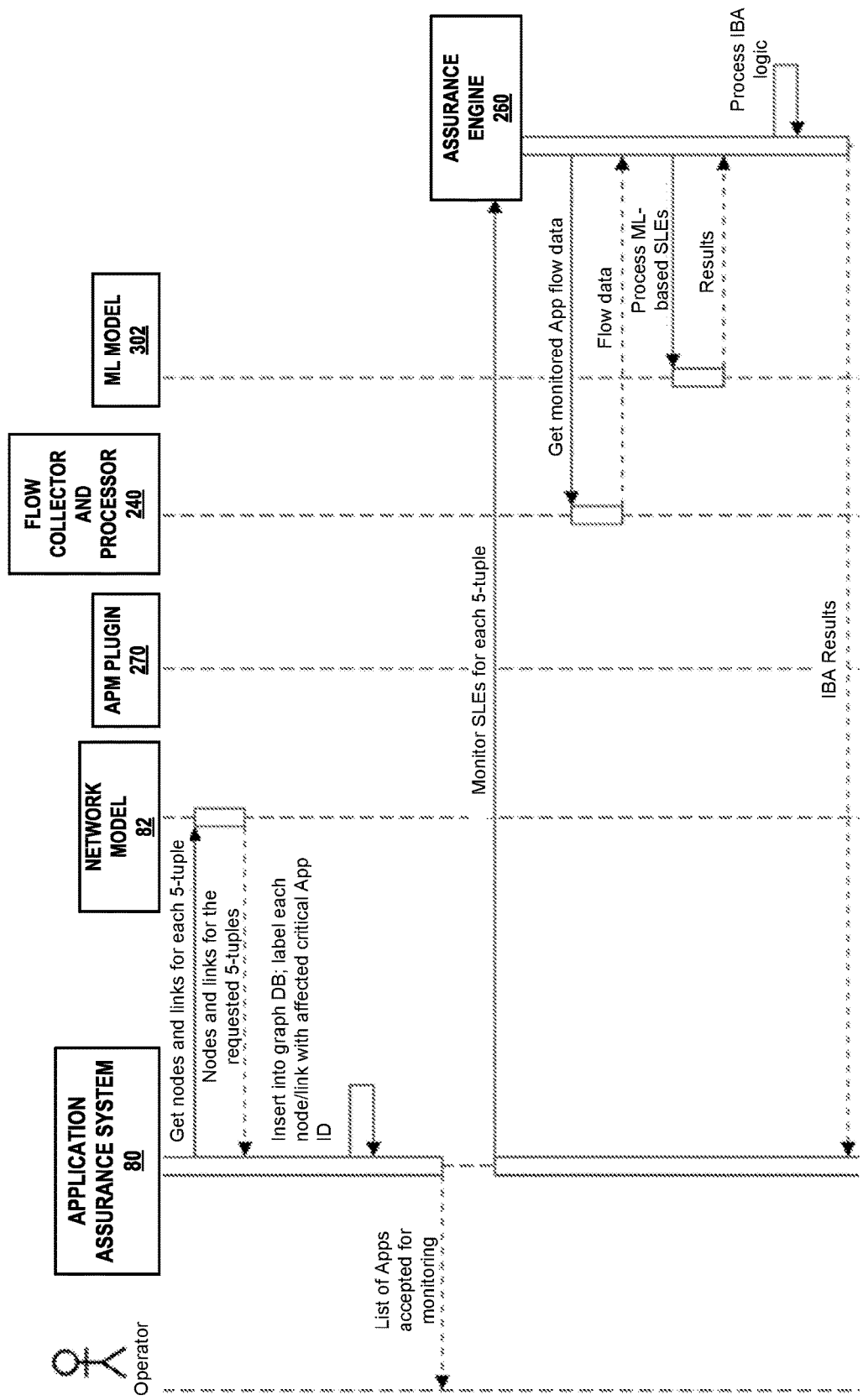
Figure 3C:
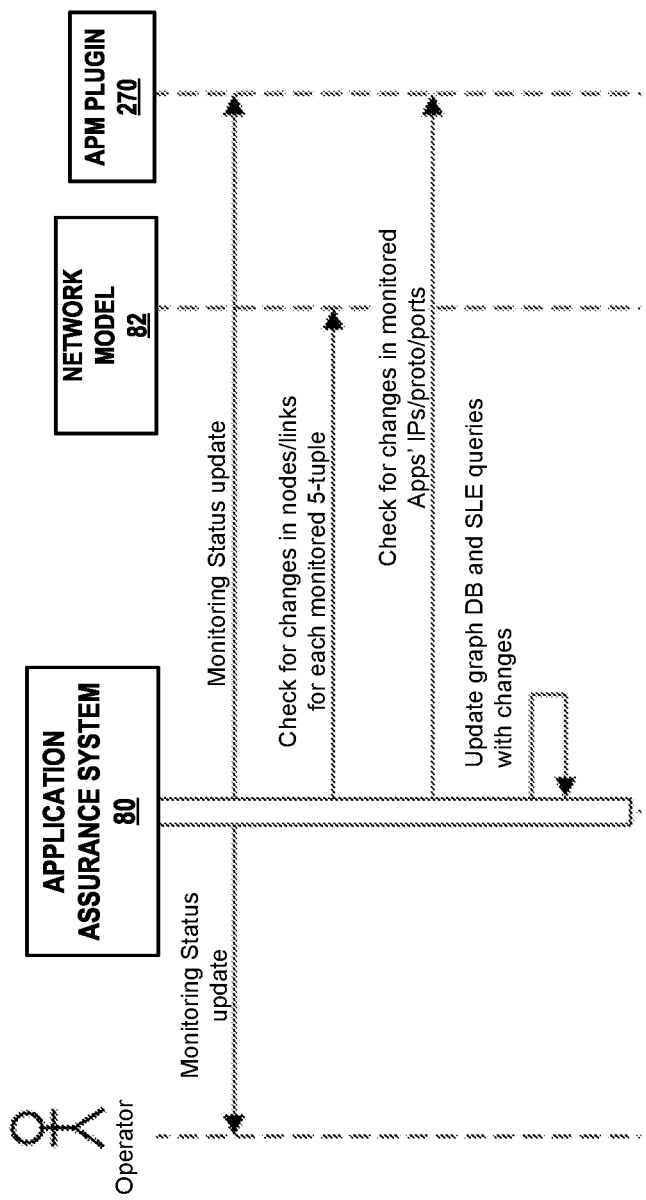

FIGS. 3A-3C depict a conceptual diagram for an example process to provide application assurance, in accordance with techniques of this disclosure. An operator invokes application assurance system 80 to discover the network. Application assurance system 80 invokes network modeler 210 to generate network model 82. On completion ("Done"), application assurance system 80 provides a ready signal to the operator.

Application assurance system 80 obtains a list of applications 200. Application assurance system 80 queries an APM for flow definitions for each of applications 202, which the APM provides to application assurance system 80 for storage to application registry 84. Using a UI 84 dialog, the operator may select certain applications 200 for analysis/assurance. Using a UI 84 dialog, the operator may provide users' IP subnets to enable application assurance system 80 to complete flow definitions 202 (e.g., "5-tuple flow definitions for the selected Apps").

Flow collector and processor 240 may represent a control plane for a flow collector, which receives information for endpoints of interest based on flow definitions 202. Flow collector and processor 240 may subscribe to this interest list, which can be maintained by application registry 84, to receive future asymmetric updates from application assurance system 80/application registry 84.

Graph generator 230 queries network model 82 with flow definitions 202 for applications 200 to receive the set of network nodes and links. Graph generator 230 may deduplicate based on multiple received sets for multiple flow definitions, and apply application labels 234 as described above. Application assurance system 80 may notify the operator of those applications accepted for monitoring.

Assurance engine 260 monitors service level indicators 262 using checks, as described above, which may be combined into composite SLEs/SLIs. Service level expectations (SLEs) are similar to service level indicators. Assurance engine 260 may optionally apply intent-based analytics (IBA). Assurance engine 260 queries flow collector and processor 240 for monitored application flow data and processes. A machine learning model may learn and refine service level indicators 262 as described above based on historical telemetry information. Assurance engine 260 processes the service level indicators 262 and performs the checks. Application assurance system 80 may output, via UI 86, results of monitoring. Application assurance system 80 may output results to an APM system.

Application assurance system 80 may periodically check for modified network topology for flow definitions 202 or changes in flow definitions 202 and update graph DB 232 as it loops through the assurance logic. To check for changes in flow definitions 202, application assurance system 80 may query an application performance monitoring (APM) system using, for instance, APM plugin 270. However, a plugin is an optional feature-application assurance system 80 may alternatively query an APM system using an interface of the APM, or check for changes in flow definitions 202 using some other procedure.

Figure 4:
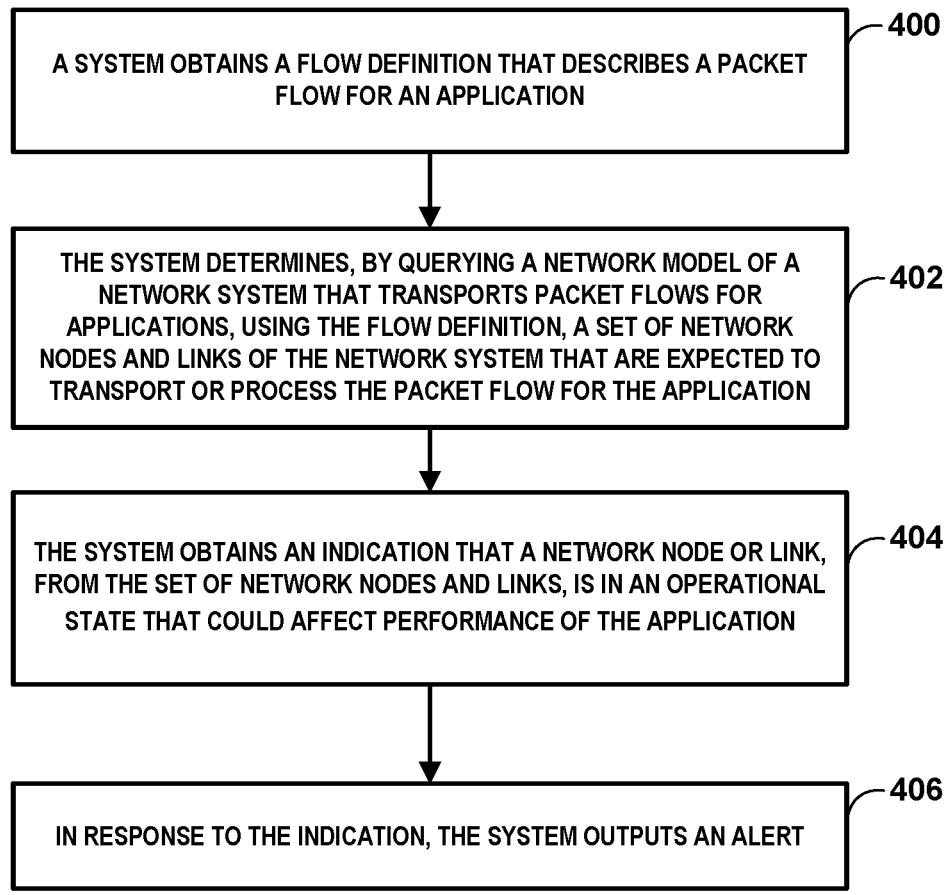
FIG. 4 is a flowchart illustrating an example mode of operation for an application assurance system, in accordance with techniques of this disclosure.

FIG. 4 is a flowchart illustrating an example mode of operation for an application assurance system, in accordance with techniques of this disclosure. Initially, application assurance system 80 obtains a flow definition 202 that describes a packet flow for an application 200 (400). Application assurance system 80 may determine, by querying a network model of a network system that transports packet flows for applications, using the flow definition, a set of network nodes and links of the network system that are expected to transport or process the packet flow for the application (402). Application assurance system 80 may obtain an indication that a network node or link, from the set of network nodes and links, is in an operational state that could affect performance of the application (404). To obtain such an indication, application assurance system 80 can determine that (1) a state of a network node or link is currently affecting an application or is expected to soon affect the application; and/or (2) analyze redundant paths that the application would take if current active path would fail due to one of the active path nodes or links—i.e., application assurance system 80 analyzes a backup path to determine whether the application would be successful or would be affected (e.g., negatively affected) if a packet flow for the application is rerouted along backup path. This redundant path analysis is not possible without a network model capable of identifying whether a backup path exists and can address any problems with the primary, active path. In response to the indication, application assurance system 80 may output an alert (406).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by computer-readable data storage media comprising instructions that, when executed, cause processing circuitry to perform one or more of the methods described above. For example, the computer-readable data storage medium may be encoded with or otherwise store such instructions for execution by one or more processors or processing circuitry.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
    obtaining, by an application assurance system, a flow definition that describes a packet flow for an application;
    determining, by the application assurance system by querying a network model of a network system that transports packet flows for applications, using the flow definition, a set of network nodes and links of the network system that are expected to transport or process the packet flow for the application;
    obtaining, by the application assurance system, an indication that a network node or link, from the set of network nodes and links, is in an operational state that could affect performance of the application; and
    in response to obtaining the indication, by the application assurance system, outputting an alert.

2. The method of claim 1, wherein the alert comprises one or more of an identifier for the application, a type of impact, or an indication of the network node or link that is in the operational state that could affect performance of the application.

3. The method of claim 1, wherein the indication comprises a first indication and the alert comprises a first alert, the method further comprising:
    determining, by the application assurance system by querying the network model, using the flow definition, a bypass set of network nodes and links of the network system that would transport the packet flow in case of failure of one of the set of network nodes and links of the network system;
    obtaining, by the application assurance system, a second indication that a network node or link, from the bypass set of network nodes and links, is in an operational state that could affect performance of the application; and
    in response to the second indication, by the application assurance system, outputting a second alert.

4. The method of claim 1, wherein obtaining the flow definition comprises one or more of querying an application performance monitoring system, receiving the flow definition from an operator, or receiving a flow record generated by a flow collector.

5. The method of claim 1, wherein obtaining the indication that a network node or link is in an operational state that could affect performance of the application comprises:
    performing, by the application assurance system, an Active Flow Path Availability Check.

6. The method of claim 1, wherein obtaining the indication that a network node or link is in an operational state that could affect performance of the application comprises:
    performing, by the application assurance system, a Flow Path Resilience Check.

7. The method of claim 1, wherein obtaining the indication that a network node or link is in an operational state that could affect performance of the application comprises:
    performing, by the application assurance system, a Flow Path Performance Check.

8. The method of claim 1, wherein obtaining the indication that a network node or link is in an operational state that could affect performance of the application comprises:
    performing, by the application assurance system, a Flow-related Network Access Security Check.

9. The method of claim 1, further comprising:
in response to the alert, reconfiguring one or more of the application or the network system.

10. The method of claim 1, wherein the set of network nodes and links of the network system that are expected to transport or process the packet flow for the application comprises a bypass set of network nodes and links of the network system that would transport the packet flow in case of failure of one of a network node or link of an active set of network nodes and links of the network system.

11. A computing system comprising processing circuitry coupled to one or more storage devices, the one or more storage devices and processing circuitry configured to:
obtain a flow definition that describes a packet flow for an application;
determine, by querying a network model of a network system that transports packet flows for applications, using the flow definition, a set of network nodes and links of the network system that are expected to transport or process the packet flow for the application;
obtain an indication that a network node or link, from the set of network nodes and links, is in an operational state that could affect performance of the application; and
in response to obtaining the indication, output an alert.

12. The computing system of claim 11, wherein the alert comprises one or more of an identifier for the application, a type of impact, or an indication of the network node or link that is in the operational state that could affect performance of the application.

13. The computing system of claim 11, wherein the indication comprises a first indication and the alert comprises a first alert, and wherein the one or more storage devices and processing circuitry are configured to:
determine, by querying the network model, using the flow definition, a bypass set of network nodes and links of the network system that would transport the packet flow in case of failure of one of the set of network nodes and links of the network system;
obtain a second indication that a network node or link, from the bypass set of network nodes and links, is in an operational state that could affect performance of the application; and
in response to the second indication output a second alert.

14. The computing system of claim 11, wherein to obtain the flow definition, the one or more storage devices and processing circuitry are configured to one or more of: query an application performance monitoring system, receive the flow definition from an operator, or receive a flow record generated by a flow collector.

15. The computing system of claim 11, wherein to obtain the indication that a network node or link is in an operational state that could affect performance of the application, the one or more storage devices and processing circuitry are configured to perform an Active Flow Path Availability Check.

16. The computing system of claim 11, wherein to obtain the indication that a network node or link is in an operational state that could affect performance of the application, the one or more storage devices and processing circuitry are configured to perform a Flow Path Resilience Check.

17. The computing system of claim 11, wherein to obtain the indication that a network node or link is in an operational state that could affect performance of the application, the one or more storage devices and processing circuitry are configured to perform a Flow Path Performance Check.

18. The computing system of claim 11, wherein to obtain the indication that a network node or link is in an operational state that could affect performance of the application, the one or more storage devices and processing circuitry are configured to perform a Flow-related Network Access Security Check.

19. The computing system of claim 11, wherein the one or more storage devices and processing circuitry are configured to:
in response to the alert, reconfigure one or more of the application or the network system.

20. Computer readable storage media comprising instructions that, when executed by processing circuitry, cause the processing circuitry to:
obtain a flow definition that describes a packet flow for an application;
determine, by querying a network model of a network system that transports packet flows for applications, using the flow definition, a set of network nodes and links of the network system that are expected to transport or process the packet flow for the application;
obtain an indication that a network node or link, from the set of network nodes and links, is in an operational state that could affect performance of the application; and
in response to obtaining the indication, output an alert.

* * * * *